United States Patent [19]

Min

[11] Patent Number: 5,455,623
[45] Date of Patent: Oct. 3, 1995

[54] METHOD AND APPARATUS FOR DISPLAYING EFFECTIVE KEYS

[75] Inventor: Byung-seog Min, Kyungki, Rep. of Korea

[73] Assignee: Samsung Electronics Co., Ltd., Kyungki, Rep. of Korea

[21] Appl. No.: 311,056

[22] Filed: Sep. 23, 1994

[30] Foreign Application Priority Data

Sep. 25, 1993 [KR] Rep. of Korea ............... 1993/19709

[51] Int. Cl.$^6$ .................................................. H04N 5/225
[52] U.S. Cl. ........................................... 348/334; 358/335
[58] Field of Search ................................ 348/333, 334, 348/220, 207, 341; 354/219, 289.1; 358/906, 335; H04N 5/225

[56] References Cited

U.S. PATENT DOCUMENTS

| | | | |
|---|---|---|---|
| 4,695,905 | 9/1987 | Utsugi | 358/335 X |
| 5,162,915 | 11/1992 | Idera et al. | 348/333 X |

FOREIGN PATENT DOCUMENTS

| | | | |
|---|---|---|---|
| 2048647 | 2/1990 | Japan | H04N 5/225 |
| 4023574 | 1/1992 | Japan | H04N 5/225 |

*Primary Examiner*—Wendy R. Greening
*Attorney, Agent, or Firm*—Sughrue, Mion, Zinn, Macpeak & Seas

[57] ABSTRACT

The present invention relates to a method and apparatus for displaying information corresponding to effective keys for changing the operation mode of a camcorder on the screen of the camcorder. The apparatus of the present invention includes a control circuit which checks present key signals input to the camcorder, determines whether the key signal can be operated to change operation from a present operating mode to a next operating mode, and displays information representing all of the effective keys which may be operated to change the operation mode of the camcorder from the present play mode on an electronic viewfinder and/or a monitor when the input key signal corresponds to a function which cannot proceed the present operating mode. Accordingly, the present invention provides the convenience of user's operation by displaying effective keys capable of proceeding from a present operating mode to a next operating mode.

5 Claims, 3 Drawing Sheets

METHOD AND APPARATUS FOR DISPLAYING EFFECTIVE KEYS

BACKGROUND OF THE INVENTION

The present invention relates to a method and apparatus for displaying information corresponding to effective function keys of a camcorder so that the camcorder may be easily manipulated, and more particularly to a method and apparatus for displaying information indicating which function keys of the camcorder are effective function keys for changing the operating mode from the present operating mode when an input key signal is not effective.

Generally, since a photographer should view both an electronic viewfinder (hereinafter referred to as "EVF") showing a picture of what is to be photographed and the area in front of the EVF when photographing objects with a camcorder, the user cannot directly view the function keys provided on the camcorder. Therefore, the user cannot recognize which function keys correspond to effective keys for altering the present operating mode because the camcorder only displays information indicating the present operating mode on a monitor. Japanese patent laid-open publication No. 04096580, published on Mar. 27, 1992, solves the above problems. The prior art provides an operating mode display and a gazing point detecting device enabling a user to easily change the operating mode of the camcorder by looking through a finder.

SUMMARY OF THE INVENTION

In order to overcome the above-mentioned problem differently from the above prior art, it is an object of the present invention to provide a method for displaying information corresponding to all of the effective keys which may be operated during the present operating mode when other key signals corresponding to function keys which are not effective for altering the present operating mode are detected as input signals.

It is another object of the present invention to provide an apparatus for performing the above method of displaying information corresponding to effective keys.

Thus, to accomplish objects of the present invention, there is provided a method for displaying information corresponding to effective keys comprising the steps of:

receiving a key signal; checking a present operating mode; determining whether the checked key signal corresponds to an effective key for the present operating mode; generating character data corresponding to information representing effective keys which are operable when the determined key signal is not an effective key; and overlapping the character data onto the video signal and displaying the overlapped data.

There is provided an apparatus for displaying information corresponding to effective keys in accordance with the present invention, the apparatus comprising:

input means for inputting a key signal; controlling means for detecting the key signal supplied from the input means, determining whether the key signal is functionable or effective in a present operating mode, controlling operation of the apparatus when the key signal is effective, and for outputting effective signal data when the input key signal is not effective; sync separating means for detecting a sync signal from the input video signal; an on screen display (OSD) unit for synchronizing character data, output in response to the data signal supplied from the controlling means, with the sync signal supplied from the sync separator; mixing means for overlapping the character data supplied from the OSD unit onto the video signal; and a display unit for displaying a signal supplied from the mixing means.

DETAILED DESCRIPTION OF PREFERRED EMBODIMENTS

Hereinbelow, a preferred embodiment of the present invention will be described with reference to the attached drawings.

Figure 1:
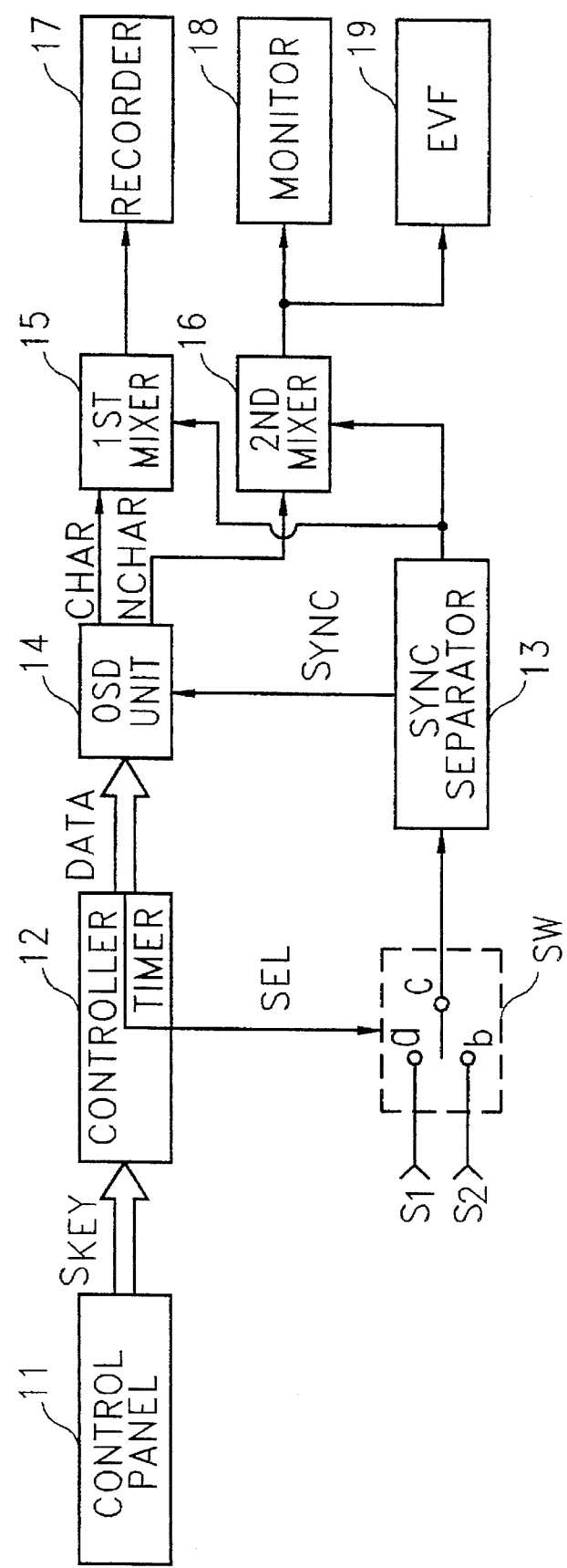
FIG. 1 is a block diagram illustrating an effective key display apparatus in accordance with the present invention.

FIG. 1 illustrates an effective key display apparatus in accordance with the present invention. In FIG. 1, a control panel 11 provided with a key-matrix manipulates a plurality of functions. An output terminal of the control panel 11 is connected to a controller 12 having a timer incorporated therein. A switch SW selectively outputs any one of a video signal $S_1$ to be recorded by the camcorder in a camera mode and a video signal $S_2$ to be reproduced by the camcorder in a VTR mode. The switch SW performs switchover operations according to a selection signal SEL supplied from the controller 12. A sync separator 13, connected to an output terminal of the switch SW, detects a sync signal from the selected video signal. An OSD unit 14 having character data is connected between the output terminals of the controller 12 and the sync separator 13. Two mixers 15, 16 are connected to the OSD unit 14. The first mixer 15 is coupled to receive both a video signal from the sync separator 13 and character data CHAR from the OSD unit 14. The second mixer 16 is coupled to receive a video signal from the sync separator 13 and character data NCHAR from the OSD unit 14 which represents effective keys capable of being applied to a present operating mode. A recorder 17, connected to an output terminal of the first mixer 15, records the output signal from the first mixer 15. The output terminal of the second mixer 16 is connected to a monitor 18 and to an electronic viewfinder 19 which display the output signal from the second mixer 16.

The operation of the effective key display apparatus in accordance with the present invention will be described in detail.

First, the controller 12 detects a key signal Skey, supplied from the control panel, which selects either the camera mode or the VTR mode of the camcorder. The controller 12 then outputs a selection signal SEL which controls the switchover operation of the switch SW. The switch SW includes a first node 'a' which receives the video signal $S_i$ to be recorded at present, and a second node 'b' which receives the video signal $S_2$ to be reproduced from a recording medium. Accordingly, the video signal $S_1$ is supplied to the sync separator 13 via the first node 'a', and the video signed $S_2$ is supplied to the sync separator 13 via the second node 'b'.

A photographer should operate a corresponding key among various keys of the control panel 11 when proceeding from the present operating mode into the next operating mode of the camcorder. The controller 12 performs the operation as shown in FIG. 2 when the function key signal Skey is supplied from the control panel 11.

Figure 2:
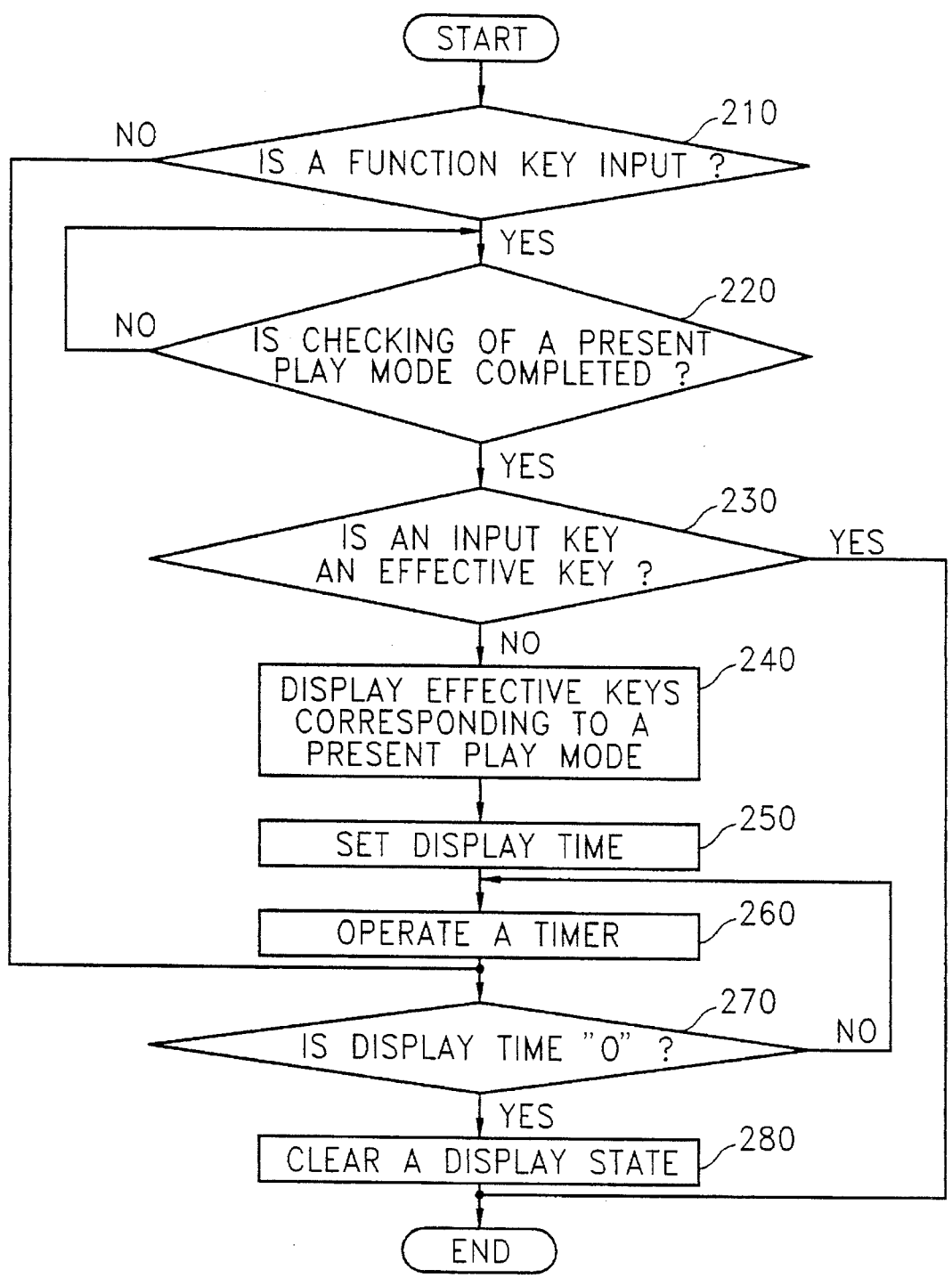
FIG. 2 is a flow chart illustrating the operation of a controller in the apparatus illustrated in FIG. 1.

FIG. 2 is a flow chart illustrating the operation of the controller 12. First, the controller 12 determines whether the function key signal Skey is supplied from the control panel 11 (step 210). When the function key signal Skey is not detected, the controller 12 determines whether the display time $T_{DISP}$ of the timer, for displaying character data is "0" (step 270). When the display time $T_{DISP}$ is "0", the controller 12 clears the character data from a display status (step 280), thereby ending the character display operation. When the display time $T_{DISP}$ not "0", the controller 12 continues operation of the timer (step 260). The timer functions to count time during display of the character data, which will be described in FIG. 3. Step 270 is repeated by the controller 12 until the display time $T_{DISP}$ is "0".

When a function key signal Skey is detected, the controller 12 checks the present operating mode (step 220), and judges whether the input function key signal Skey is effective for changing the present operating mode (step 230). For example, in the case that the input function key signal Skey corresponds to a stop mode under the present operating mode, the input key signal is determined to be an effective key and the controller 12 controls each part of the system so that operation is accomplished from the present operating mode to the stop mode. In the case that the input function key signal Skey corresponds to a record mode when the camcorder is presently operating under the play mode, the input key signal is determined to correspond to a non-effective key and the controller 12 controls each part of the system so that character data which represents the effective keys in the present operating mode is displayed (step 240). The display time is set at step 250, and the timer is actuated at step 260.

Figure 3:
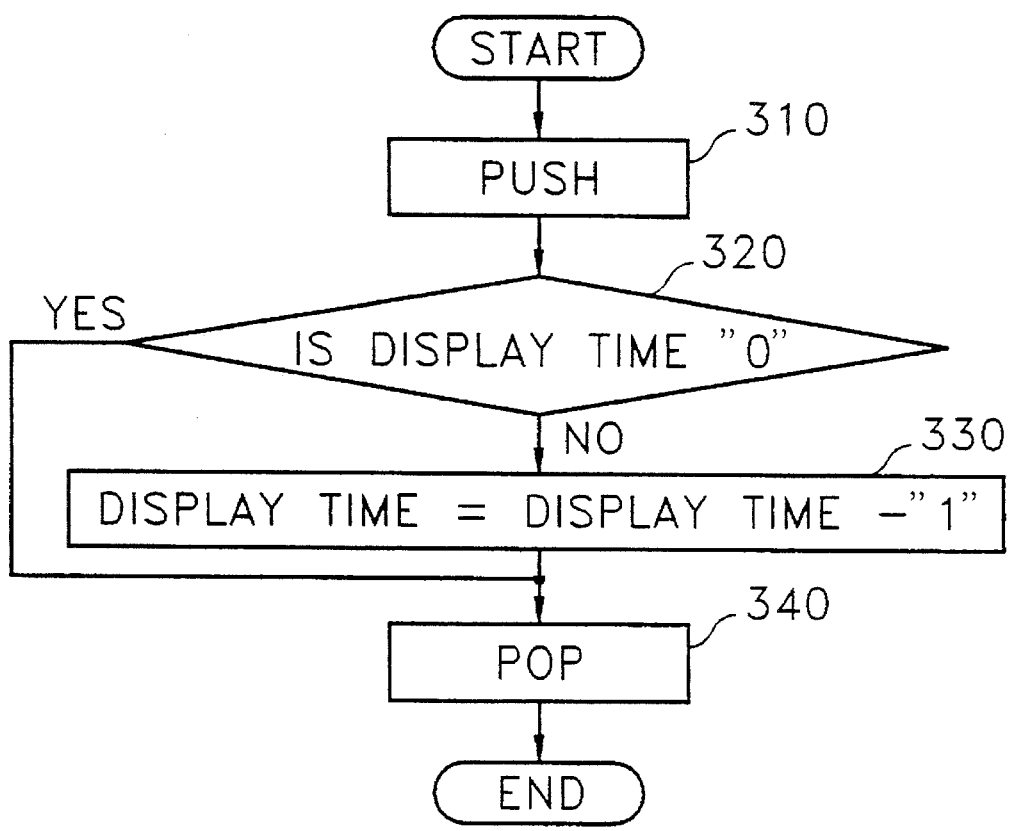
FIG. 3 is a flow chart illustrating the operation of a timer incorporated within the controller illustrated in FIG. 1.

FIG. 3 is a flow chart illustrating the operation of the timer incorporated in the controller 12. The timer pushes the display time on the monitor and/or the EVF of character data stored in storing means (not shown) (step 310). The timer judges if the pushed time is "0" (step 320), and pops the time itself at the storing means when the pushed time is "0", and then ends the operation. The timer value is decremented by one each second (in the case of a second-timer) when the pushed time is not "0" (330). The reduced time is popped at the storing means at step 340 and the operation is completed.

Referring to FIG. 2, along with the operation of the timer as shown in FIG. 3, the controller 12 checks the present operating mode and the display time $T_{DISP}$ of character data which indicates the effective keys corresponding to the present operating mode (step 270). The controller 12 controls the operation so that step 270 and step 260 are repeated when the character data is not displayed for a preset time. When the character data is displayed for the preset time, the data under a display status is cleared (step 280) and the operation is completed. Table 1 shows whether mode keys in the present operating mode are effective keys for altering the operation of the camcorder from the present operating mode. In addition, the left side modes are first performed when a plurality of key signals are input.

TABLE 1

| | Conversion Mode | | | | | | | | | | | | | | |
| --- | --- | --- | --- | --- | --- | --- | --- | --- | --- | --- | --- | --- | --- | --- | --- |
| Present Mode | STOP | EJT | REW | FWD | FPS | RPS | STILL | REC + NPB | DUB + NPB | NPB | SPB | FPB | REC + PAU | DUB + PAU | F/ ADV | REC + DUB |
| STOP | | O | O | O | X | X | X | O | O | O | X | X | X | X | X | X |
| EJECT | O | | X | X | X | X | X | X | X | X | X | X | X | X | X | X |
| REW | O | O | | O | X | X | X | O | O | O | X | X | X | X | X | X |
| FWD | O | O | O | | X | X | X | O | O | O | X | X | X | X | X | X |
| STILL | O | O | X | O | O | O | | O | O | O | O | O | X | X | O | O |
| REC + NPB | O | X | X | X | X | X | X | | X | X | X | X | O | X | X | X |
| DUB + NPB | O | X | X | X | X | X | X | X | | X | X | X | O | X | X | X |
| NPB | O | O | X | X | O | O | O | O | O | | O | O | X | X | X | X |
| SPB | O | O | X | X | O | O | O | O | O | O | | O | X | X | X | X |
| FPB | O | O | X | X | O | O | O | O | O | O | O | | X | X | X | X |
| REC + PAU | O | X | X | X | X | X | X | O | X | X | X | X | | O | X | X |
| DUB + PAU | O | X | X | X | X | X | X | O | O | X | X | X | O | | X | X |
| REC + DUB | O | X | X | X | X | X | X | X | X | X | X | X | X | X | | |

O: possible mode
X: impossible mode

Referring to FIG. 1, the sync separator 13 detects a sync signal Sync from the selected video signal supplied from the switch SW and simultaneously supplies it to the OSD unit 14 as well as to the first and second mixers 15 and 16, respectively. The OSD unit 14 receives information representing a present operating mode from the controller 12 and determines character data corresponding to effective keys of the present operating mode, synchronizes the character data with the sync signal Sync supplied from the sync separator 13, and outputs both record character data CHAR for recording character data and non-record character data NCHAR for displaying on the monitor and/or EVF. The first mixer 15 outputs data by overlapping the character data CHAR from the OSD unit 14 onto the video signal input via the sync separator 13 where the camcorder is set to a camera mode. The video signal, to which the record character data CHAR is inserted, is supplied to the recorder 17 so that it can be recorded on the recording medium.

The second mixer 16 outputs data by overlapping the non-record character data NCHAR from the OSD unit 14 onto the video signal input via the sync separator 13 when the camcorder is set to a camera mode or a VTR mode. The video signal, into which the non-record character data NCHAR is inserted, is supplied to the monitor 18 and the EVF 19, which are coupled to the camcorder, respectively. The monitor 18 and/or the EVF 19 display the signal supplied from the second mixer 16 so that an operator can easily recognize the operating modes which are available in the present operating mode of the camcorder.

As described above, a method and apparatus for displaying information corresponding to effective keys according to the present invention provides for easy operation of the camcorder by informing a user of effective keys capable of being operated to change the operation from the present operating mode to next operating mode.

What is claimed is:

1. An effective key display apparatus for a camcorder, which includes a key panel having keys corresponding to respective operating modes of said camcorder wherein a key signal is generated when a corresponding one of said keys is depressed by an operator, for displaying a video signal and information corresponding to effective keys representing operating modes which are operable from a present operating mode of said camcorder, said effective key display apparatus comprising:

input means for inputting a key signal corresponding to one of said operating modes of said camcorder;

control means for detecting said key signal supplied from said input means, for determining whether said key signal corresponds to an effective key representing an operating mode which is operable from said present operating mode, for initiating said operating mode when said key signal corresponds to one of said effective keys; and for outputting a data signal when said key signal does not correspond to one of said effective keys;

sync separating means for detecting a sync signal from said video signal;

an on screen display unit, responsive to said data signal from said control means, for determining character data representing said effective keys corresponding to respective operating modes which are operable from said present operating mode, and for synchronizing said character data with said sync signal supplied from said sync separating means;

mixing means for overlapping said character data supplied from said on screen display unit with said video signal; and a display unit for displaying a signal supplied from said mixing means.

2. The effective key display apparatus as claimed in claim 1, wherein said control means comprises a timer for controlling a display time for displaying said character data.

3. A method for displaying key information of a camcorder and a video signal, said camcorder including a key panel having keys corresponding to respective operating modes of said camcorder wherein a key signal is generated when a corresponding one of said keys is depressed by an operator, wherein said key information corresponds to effective keys representing operating modes of said camcorder which are operable from a present operating mode, said method comprising the steps of:

receiving said key signal;

determining said present operating mode;

determining whether said key signal corresponds to an effective key representing an operating mode which is operable from said present operating mode;

generating character data corresponding to effective keys representing operating modes which are operable from said present operating mode when said key signal does not correspond to one of said effective keys;

overlapping said character data onto said video signal; and displaying a resulting signal.

4. The method claimed in claim 3, wherein said displaying step comprises the steps of setting a display time of said character data, and clearing said character data when said display time has elapsed.

5. The method claimed in claim 4, wherein said overlapping step comprises the step of synchronizing said character data with said video signal.

* * * * *